(12) United States Patent
Shiraishi et al.

(10) Patent No.: US 7,255,722 B2
(45) Date of Patent: Aug. 14, 2007

(54) GAS FILTER

(75) Inventors: Kenji Shiraishi, Kanagawa (JP); Naoki Natori, Kanagawa (JP)

(73) Assignee: Wako Filter Technology Co, Tokyo (JP)

( * ) Notice: Subject to any disclaimer, the term of this patent is extended or adjusted under 35 U.S.C. 154(b) by 164 days.

(21) Appl. No.: 10/734,541

(22) Filed: Dec. 12, 2003

(65) Prior Publication Data

US 2004/0206060 A1 Oct. 21, 2004

(30) Foreign Application Priority Data

Dec. 18, 2002 (JP) .............................. 2002-366388

(51) Int. Cl.
*B01D 53/04* (2006.01)

(52) U.S. Cl. ...................... 55/487; 55/367; 55/498; 55/524; 55/527; 55/528; 55/DIG. 25; 210/489; 210/496; 210/497.1; 210/497.2; 210/505

(58) Field of Classification Search ................ 55/487, 55/527, 528, 498, 524, DIG. 25, 367; 210/489, 210/496, 497.1, 497.2, 505
See application file for complete search history.

(56) References Cited

U.S. PATENT DOCUMENTS

| | | | | | |
|---|---|---|---|---|---|
| 2,826,265 | A | * | 3/1958 | De Woody | 96/223 |
| 3,527,027 | A | * | 9/1970 | Knight et al. | 96/134 |
| 4,102,785 | A | * | 7/1978 | Head et al. | 210/767 |
| 4,156,601 | A | * | 5/1979 | Pieciak | 55/367 |
| 4,231,768 | A | * | 11/1980 | Seibert et al. | 96/128 |
| 4,324,574 | A | * | 4/1982 | Fagan | 55/487 |
| 4,336,043 | A | * | 6/1982 | Aonuma et al. | 55/483 |
| 4,519,819 | A | * | 5/1985 | Frantz | 96/115 |
| 4,692,175 | A | * | 9/1987 | Frantz | 96/408 |
| 4,759,782 | A | * | 7/1988 | Miller et al. | 55/487 |
| 4,877,527 | A | * | 10/1989 | Brownell | 210/489 |
| 4,915,714 | A | * | 4/1990 | Teague et al. | 55/486 |
| 5,252,207 | A | * | 10/1993 | Miller et al. | 210/335 |
| 5,605,748 | A | * | 2/1997 | Kennedy et al. | 55/486 |
| 5,713,972 | A | * | 2/1998 | Snyder, Sr. | 55/317 |
| 5,792,227 | A | * | 8/1998 | Kahlbaugh et al. | 55/486 |

(Continued)

FOREIGN PATENT DOCUMENTS

JP 20012923 5/2001

OTHER PUBLICATIONS

Webster's Ninth New Collegiate Dictionary, Merriam-Webster Inc. 1991, p. 475.*

*Primary Examiner*—Duane Smith
*Assistant Examiner*—Minh-Chau T. Pham
(74) *Attorney, Agent, or Firm*—Robert W. J. Usher

(57) ABSTRACT

A filtration portion 11 constituting a filter element 3 is composed of a first filtration material 9 wound around the outer periphery of an inner tube 8 and a second filtration material 10 wound tightly around the outer peripheral surface of the first filtration material 9, and gas comprising oil mist is passed inside the filtration portion 11 from the inner peripheral surface to the outer peripheral surface thereof. As a result, a filter with good oil mist separation efficiency can be provided in which oil mist can be trapped and caused to condensate into oil drops with the first filtration material 9 and the oil drops can be grown with the second filtration material 10 and separated from the gas.

20 Claims, 1 Drawing Sheet

U.S. PATENT DOCUMENTS

| | | | |
|---|---|---|---|
| 5,800,597 A | * | 9/1998 | Perrotta et al. .................. 96/9 |
| 5,830,250 A | * | 11/1998 | Shirk et al. .................. 55/498 |
| 6,153,098 A | * | 11/2000 | Bayerlein et al. ........ 210/497.1 |
| 6,235,089 B1 | * | 5/2001 | Erdmannsdoerfer ........... 96/55 |
| 6,521,321 B2 | * | 2/2003 | Kahlbaugh et al. ......... 428/181 |
| 6,585,794 B2 | * | 7/2003 | Shimoda et al. .............. 55/527 |

* cited by examiner

FALL OF OIL DROP

GAS FILTER

FIELD OF THE INVENTION

The present invention relates to a gas filter for passing a gas comprising oil mist and separating and removing the oil mist.

BACKGROUND OF THE INVENTION

When CNG (Compressed Natural Gas) is used as a fuel, oil dispersed from, for example, a compressor during compression of natural gas is sometimes admixed as oil mist to the CNG. If the CNG containing the oil mist is supplied to an engine, the combustion efficiency is decreased. Therefore, it is necessary to remove the oil mist from the gas (CNG).

Furthermore, if combustion gas (blow-by gas) leaking from a combustion chamber of an engine is emitted to the atmosphere, it causes environmental pollution. For this reason, this gas is circulated again to the combustion chamber with a blow-by gas circulation unit and combusted. However, engine oil used for engine lubrication is dispersed, e.g., from cylinders and admixed as oil mist to the blow-by gas. Directly supplying such blow-by gas containing oil mist causes problems.

For this reason, a gas filter has been suggested for separating and removing oil mist from a gas such as the above-described CNG and blow-by gas (for example, Japanese Patent Application Laid-open No. 2001-120932).

In such a gas filter, a high separation (filtration) efficiency has to be implemented upon adjusting, for example, pressure loss of the filter element according to the properties of the gas which is to be filtered. However, with the conventional products, such an adjustment was difficult, and sufficient separation efficiency of oil mist could not be obtained for certain types of gases.

SUMMARY OF THE INVENTION

It is an object of the present invention to provide a gas filter for effective separation of oil mist contained in the gas by employing a two-layer structure in which the filtration materials of a filter element formed to have a cylindrical shape are made of glass paper and a nonwoven fabric and are wound around an inner tube.

The gas filter in accordance with the first invention comprises a cylindrical case (for example, a housing 2 in the preferred embodiment) and a filter element provided inside the cylindrical case, wherein an inlet hole and an outlet hole are formed in the cylindrical case. The gas filter has a structure such that the filter element comprises a filtration portion formed to have a cylindrical shape, the filter element is provided inside the cylindrical case so that the inside of the cylindrical case is divided into an inner peripheral space surrounded by the inner peripheral surface of the filtration portion, and an outer peripheral space surrounded by the outer peripheral surface of the filtration portion and the inner surface of the cylindrical case, the inlet hole is formed in the cylindrical case so as to communicate with the inner peripheral space, the outlet hole is formed in the upper portion of the cylindrical case so as to communicate with the outer peripheral space. Gas introduced from the inlet hole into the inner peripheral space is caused to pass through the filtration portion, outflow into the outer peripheral space and outflow to the outside from the outlet hole, and oil mist contained in the gas is separated and removed by the filter element. In this filter, the filtration portion is composed of a first filtration material formed to have a cylindrical shape and a second filtration material formed to have a cylindrical shape in intimate contact with the outer peripheral surface of the first filtration material, and the first filtration material is made of glass paper and the second filtration material is made of a nonwoven fabric.

With such a configuration, it is possible to provide a gas filter for effective separation of oil mist contained in a gas upon setting, e.g., a pressure loss of the filtration material according to the type of the gas which is to be filtered.

The gas filter in accordance with the second invention comprises a cylindrical case and a filter element provided inside said cylindrical case, wherein an inlet hole and an outlet hole are formed in the cylindrical case. The gas filter has a structure such that the filter element comprises a filtration portion formed to have a cylindrical shape, the filter element is provided inside the cylindrical case so that the inside of the cylindrical case is divided into an inner peripheral space surrounded by the inner peripheral surface of the filtration portion, and an outer peripheral space surrounded by the outer peripheral surface of the filtration portion and the inner surface of the cylindrical case, the inlet hole is formed in the cylindrical case so as to communicate with the outer peripheral space, and the outlet hole is formed in the upper portion of the cylindrical case so as to communicate with the inner peripheral space. Gas introduced from the inlet hole into the outer peripheral space is caused to pass through the filtration portion, outflow into the inner peripheral space and outflow to the outside from the outlet hole, and oil mist contained in the gas is separated and removed by the filter element. The filtration portion is composed of a second filtration material formed to have a cylindrical shape and a first filtration material formed to have a cylindrical shape in intimate contact with the outer peripheral surface of the second filtration material, and the first filtration material is made of glass paper and the second filtration material is made of a nonwoven fabric.

With such a configuration, too, it is possible to provide a gas filter for effective separation of oil mist contained in a gas upon setting, e.g., a pressure loss of the filtration material according to the type of the gas which is to be filtered.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

The preferred embodiments of the present invention will be described hereinbelow with reference to the appended drawings. The gas filter in accordance with the present invention is used for removing oil mist contained in CNG or blow-by gas. In the case of CNG engines, in order to separate oil mist discharged from a compressor and admixed to the CNG, the gas filter in accordance with the present invention is provided between the fuel tank of a CNG supply apparatus and a supply opening or between a fuel tank and an engine of a vehicle carrying a CNG engine to separate the oil mist from the CNG. Furthermore, when oil mist admixed to propane gas in a blow-by gas circulation system is separated, the gas filter is provided in the blow-by gas circulation system provided between the cylinder head of the engine and the intake system to separate the oil mist contained in the blow-by gas.

Figure 1:
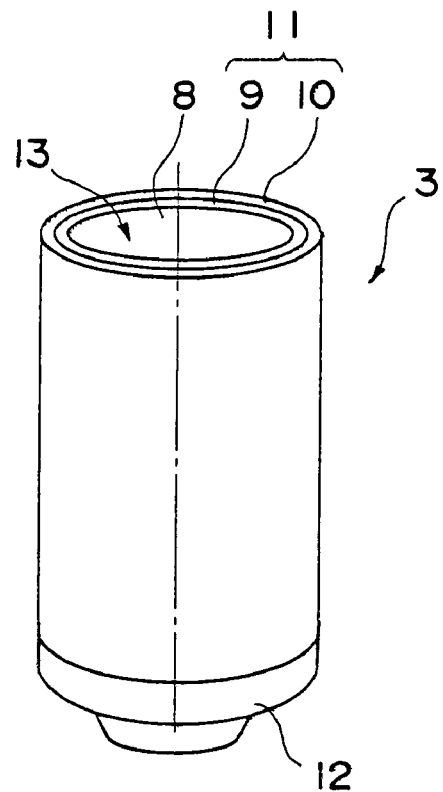
FIG. 1 is a structural view of the gas filter in accordance with the first invention.
Figure 2:
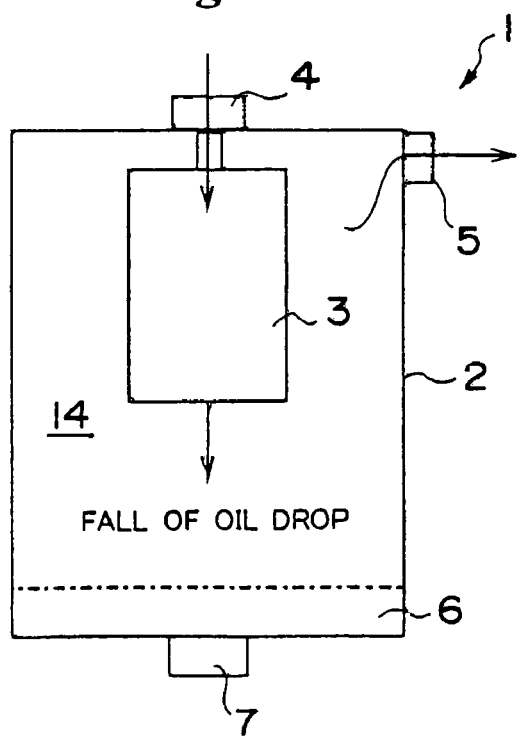
FIG. 2 is a schematic view of the filter element in accordance with the first invention.

FIG. 1 and FIG. 2 illustrate the structure of the gas filter and filter element in accordance with the present invention. A gas filter 1 is composed of an open-end cylindrical housing 2 and a filter element 3 provided inside the housing 2. The filter element 3 comprises a cylindrical inner tube 8 having a plurality of orifices formed in the circumferential surface thereof and a cylindrical filtration portion 11 composed of a first filtration material 9 wound tightly around the outer peripheral surface of the inner tube 8 and a second filtration material 10 wound tightly around the outer peripheral surface of the first filtration material 9. The inner tube 8 and filtration portion 11 are sandwiched between the end plates 12 provided at both ends in the cylinder axis direction of the filter element 3 (in FIG. 2, the end plate 12 provided on the top is not presented in order to show the structure of the filter element 3).

An orifice communicating with an inner peripheral space 13 (a plurality of orifices are formed in the cylindrical surface of the inner tube 8, and inner peripheral space 13 is surrounded by the inner peripheral surface of the filtration portion 11) surrounded by the inner peripheral surface of the inner tube 8 and the end plate 12 is formed in the end plate 12 provided in the upper portion of the filter element 3, and this orifice and an inlet hole 4 formed in the top portion of the housing 2 are provided so as to be in tight contact and communicate with each other. Furthermore, an outer peripheral space 14 is formed between the outer peripheral surface of the filter element 3 (that is, the outer peripheral surface composed by the end plate 12 and the outer peripheral surface of the filtration portion 11) and the inner surface of the housing 2, and this outer peripheral space 14 and an outlet hole 5 formed in the top portion of the housing 2 communicate with each other.

With such a configuration, the inside of the housing 2 is divided by the filter element 3 into the inner peripheral space 13 and the outer peripheral space 14, and when a gas comprising oil mist is introduced from the inlet hole 4 into the inner peripheral space 13 and caused to pass inside the filtration part 11 of the filter element 3 from the inner peripheral surface toward the outer peripheral surface, the oil mist can be separated and the gas having the oil mist removed therefrom can be caused to flow out through the outer peripheral space 14 and from the outlet hole 5. Furthermore, the oil mist separated by the filter element 3 is trapped by the filtration part 11 of the filter element 3 and converted into oil drops which flow downward along the outer peripheral surface of the filtration part 11 and accumulate in a bottom portion 6 of the housing 2. Further, a drain hole 7 is formed in the bottom surface of the housing 2 in order to drain the oil accumulated in the bottom portion 6 of the housing 2.

The filtration portion 11 of the filter element 3 is composed by winding the first filtration material 9 on the outer peripheral surface of the inner tube 8 and then tightly winding the second filtration material 10 on the outer peripheral surface of the first filtration material 9, in the order of the gas passing therethrough. In this case, the separation efficiency of oil mist from gas can be improved by producing the first filtration material 9 from glass paper with good wetting ability of fibers and producing the second filtration material 10 from a nonwoven fabric with good wetting ability of fibers and a pore diameter larger than that in the first filtration material 9.

With such a configuration, when a gas comprising oil mist passes through the first filtration material 9, the oil mist is trapped by the first filtration material 9 and condensed into oil drops. Those oil drops are pushed by the gas flow and moved into the second filtration material 10, but scattering of the oil drops in the second filtration material 10 is prevented. Moreover, under the effect of the second filtration material 10, the oil drops grow in size and exit at the outer peripheral surface of the second filtration material 10 (that is, at the outer peripheral surface of the filtration portion 11 constituting the filter element 3). Because the oil drops that exited at the outer peripheral surface of the filtration portion 11 have a certain large size, they fall down and accumulate at the bottom surface 6 of the housing 2, without being scattered with the gas of the outer peripheral space 14 and ejected from the outlet hole 5. At this time, the separation efficiency of oil mist in the filtration portion 11 can be adjusted by the pore diameter of the base material (that is, glass paper and nonwoven fabric) constituting the first filtration material 9 and second filtration material 10 and the number of layers of the base material. Further, part of the oil mist that passed through the filter element 3 is trapped on the inner peripheral surface of the first filtration material 9 and accumulated in the form of oil drops on the bottom surface inside the filter element 3, but when the quantity thereof exceeds the prescribed quantity, it oozes out of the filtration portion 11, falls down on the bottom surface 6 of the housing 2, and accumulates therein.

Further, in the above-described embodiment, the gas filter of the first embodiment was described and the structure was shown in which the gas was passed inside the filter element 3 from the inner peripheral surface to the outer peripheral surface thereof. However, a gas filter of the second embodiment, which has a similar shape, can be also implemented by employing a structure in which the gas is passed inside the filter element 3 from the outer peripheral surface to the inner peripheral surface thereof. In this case, in the filtration portion 11, the second filtration material (nonwoven fabric) is wound around the outer peripheral surface of the inner tube 8, and the first filtration material (glass paper) is wound around in tight contact with the outer peripheral surface of the second filtration material.

Furthermore, in the above-described embodiments, the glass paper and nonwoven fabric were used for the first filtration material 9 and the second filtration material 10 and wound around the inner tube 8. However, a structure can be also used in which the glass paper and nonwoven fabric are folded in the form of bellows and formed to obtain a chrysanthemum-like shape rounded into a ring. Furthermore, a molded body obtained by molding a glass filtration material into a cylindrical shape can be also used for the first filtration material 9. PET, PE, PP, rayon, cotton, and Nylon can be used as the base materials for the nonwoven fabric.

The embodiments are described below. The first and second embodiments relate to a gas filter of the above-described first invention. The first embodiment relates to a gas filter for CNG and the second embodiment relates to a gas filter for blow-by gas.

First Embodiment

In the present embodiment, glass paper with a pore diameter of 5 μm was wound three times as the first filtration material 9, and a PET nonwoven fabric with a pore diameter of 55 μm was wound five times as the second filtration material 10. Such a configuration made it possible to obtain a gas filter with good efficiency of separating oil mist from CNG.

Second Embodiment

In the present embodiment, glass paper with a pore diameter of 20 μm was wound once as the first filtration material 9, and a PET nonwoven fabric with a pore diameter of 55 μm was wound four times as the second filtration material 10. Such a configuration made it possible to obtain a gas filter with good efficiency of separating oil mist from blow-by gas and a small pressure loss.

As described hereinabove, with the gas filter in accordance with the first invention, composing the filtration portion constituting the filter element of the first filtration material in which glass paper is wound to have a cylindrical shape and the second filtration material in which a nonwoven fabric is wound in intimate contact around the outer peripheral surface of the first filtration material and passing gas comprising oil mist inside the filtration portion from the inner peripheral surface to the outer peripheral surface thereof makes it possible to trap the oil mist and cause it to condensate into oil drops in the first filtration material and then to grow the oil drops in the second filtration material and separate them from the gas. As a result, it is possible to provide a gas filter for effective separation of oil mist upon adjusting, e.g., a pressure loss according to the gas which is to be filtered.

Further, with the gas filter in accordance with the second invention, composing the filtration portion constituting the filter element of the second filtration material in which a nonwoven fabric is wound to have a cylindrical shape and the first filtration material in which glass paper is wound in intimate contact around the outer peripheral surface of the second filtration material and passing gas comprising oil mist inside the filtration portion from the outer peripheral surface to the inner peripheral surface thereof makes it possible to trap the oil mist and cause it to condensate into oil drops in the first filtration material and then to grow the oil drops in the second filtration material and separate them from the gas. As a result, it is possible to provide a gas filter for effective separation of oil mist upon adjusting, e.g., a pressure loss according to the gas which is to be filtered.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2002-366388 filed on Dec. 18, 2002, which is incorporated herein by reference.

What is claimed is:

1. A gas filter for removing oil mist from a gas comprising a cylindrical case and a filter element provided inside said cylindrical case, an inlet hole and an outlet hole being formed in said cylindrical case, the gas filter having a structure such that said filter element comprises a filtration portion formed to have a cylindrical shape;

said filter element is provided inside said cylindrical case so that the inside of said cylindrical case is divided into an inner peripheral space surrounded by the inner peripheral surface of said filtration portion, and an outer peripheral space surrounded by the outer peripheral surface of said filtration portion and the inner surface of said cylindrical case;

said inlet hole is formed in said cylindrical case so as to communicate with said inner peripheral space, said outlet hole is formed in the upper portion of said cylindrical case so as to communicate with said outer peripheral space, gas introduced from said inlet hole into said inner peripheral space is caused to pass through said filtration portion, outflow into said outer peripheral space and outflow to the outside from said outlet hole, and oil mist contained in said gas is separated and removed by said filter element, wherein said filtration portion is composed of only two layers of only two filtration materials being a first layer of a first filtration material formed to have a cylindrical shape with an inner cylindrical surface communicating with said inner peripheral space and a second layer of a second filtration material formed to have a cylindrical shape in intimate contact with the outer peripheral surface of said first filtration material and with an outer cylindrical surface communicating with said outer peripheral space so that the gas passes initially through said first filtration material and subsequently through said second filtration material;

said first filtration material is made of glass paper and said second filtration material is made of a nonwoven fabric; and wherein a base material of said nonwoven fabric is any of PET, PE, PP, rayon, cotton, and Nylon and wherein:

said filter element is composed of a cylindrical inner tube having a plurality of orifices formed therein, said first filtration material being wound tightly around the outer peripheral surface of said inner tube, and said second filtration material being wound tightly around the outer peripheral surface of said first filtration material, and, so that the first filtration material can be wound a preselected different number of times to provide a layer of different thicknesses and the second filtration material can be wound a preselected different number of times to provide a layer of different thicknesses to adjust the filtration efficiency and the pressure drop.

2. The gas filter according to claim 1, wherein the upper and lower end portions of said inner tube having said first and second filtration materials wound therearound are closed with upper and lower end plates, a communication orifice communicating with said inner peripheral space is formed in said upper end plate, and said inner peripheral space communicates with said inlet hole via said communication orifice.

3. The gas filter according to claim 1, wherein a drain hole for draining oil accumulated inside is provided in the bottom portion of said cylindrical case.

4. The gas filter according to claim 1, wherein the gas is CNG (Compressed Natural Gas) containing oil mist, and the gas filter is provided inside a channel connected from a CNG supply source to the supply destination.

5. The gas filter according to claim 1, wherein said gas is an engine blow-by gas, and the gas filter is provided in a channel leading from a cylinder head of the engine in an engine blow-by gas circulation system to an intake system.

6. A gas filter for removing oil mist from a gas comprising a cylindrical case and a filter element provided inside said cylindrical case, an inlet hole and an outlet hole being formed in said cylindrical case, the gas filter having a structure such that
    said filter element comprises a filtration portion formed to have a cylindrical shape;
    said filter element is provided so that the inside of said cylindrical case is divided into an inner peripheral space surrounded by the inner peripheral surface of said filtration portion, and an outer peripheral space surrounded by the outer peripheral surface of said filtration portion and the inner surface of said cylindrical case;
    said inlet hole is formed in said cylindrical case so as to communicate with said outer peripheral space, said outlet hole is formed in the upper portion of said cylindrical case so as to communicate with said inner peripheral space, gas introduced from said inlet hole into said outer peripheral space is caused to pass through said filtration portion, inflow into said inner peripheral space and outflow to the outside from said outlet hole, and oil mist contained in said gas is separated and removed by said filter element, wherein
    said filtration portion is composed of only two layers of only two filtration materials being a second filtration material formed to have a cylindrical shape with an outer cylindrical surface communicating with said outer peripheral space and a first filtration material formed to have a cylindrical shape in intimate contact with the outer peripheral surface of said second filtration material and with an outer cylindrical surface communicating with said outer peripheral space so that the gas passes initially through said first filtration material and subsequently through said second filtration material;
    said first filtration material is made of glass paper and said second filtration material is made of a nonwoven fabric; and
    wherein a base material of said nonwoven fabric is any of PET, PE, PP, rayon, cotton, and Nylon and wherein said filter element is composed of a cylindrical inner tube having a plurality of orifices formed therein, said second filtration material wound tightly around the outer peripheral surface of said inner tube, and said first filtration material wound tightly around the outer peripheral surface of said second filtration material, and, so that the second filtration material can be wound a preselected different number of times to different thicknesses and the second filtration material can be wound a preselected different number of times to different thicknesses to adjust the filtration efficiency and the pressure drop.

7. The gas filter according to claim 6, wherein the upper and lower end portions of said inner tube having said first and second filtration materials wound therearound are closed with upper and lower end plates, a communication orifice communicating with said inner peripheral space is formed in said upper end plate, and said inner peripheral space communicates with said outlet hole via said communication orifice.

8. The gas filter according to claim 6, wherein a drain hole for draining oil accumulated inside is provided in the bottom portion of said cylindrical case.

9. The gas filter according to claim 6, wherein the gas is CNG (Compressed Natural Gas) containing oil mist, and the gas filter is provided inside a channel connected from a CNG supply source to the supply destination.

10. The gas filter according to claim 6, wherein said gas is an engine blow-by gas, and the gas filter is provided in a channel leading from a cylinder head of the engine in an engine blow-by gas circulation system to an intake system.

11. The gas filter according to claim 1, wherein the first and the second filtration materials each have a good wetting ability and the second filtration material has a pore diameter larger that a pore diameter of the first filtration material to improve separation efficiency of oil mist from gas.

12. The gas filter according to claim 6, wherein the the first and the second filtration materials each have a good wetting ability and the second filtration material has a pore diameter larger that a pore diameter of the first filtration material to improve separation efficiency of oil mist from gas.

13. A gas filter for removing oil mist from a gas comprising a cylindrical case and a filter element provided inside said cylindrical case, an inlet hole and an outlet hole being formed in said cylindrical case, the gas filter having a structure such that
    said filter element comprises a filtration portion formed to have a cylindrical shape;
    said filter element is provided inside said cylindrical case so that the inside of said cylindrical case is divided into an inner peripheral space surrounded by the inner peripheral surface of said filtration portion, and an outer peripheral space surrounded by the outer peripheral surface of said filtration portion and the inner surface of said cylindrical case;
    said inlet hole is formed in said cylindrical case so as to communicate with said inner peripheral space, said outlet hole is formed in the upper portion of said cylindrical case so as to communicate with said outer peripheral space, gas introduced from said inlet hole into said inner peripheral space is caused to pass through said filtration portion, outflow into said outer peripheral space and outflow to the outside from said outlet hole, and oil mist contained in said gas is separated and removed by said filter element, wherein:
    said filtration portion is composed of only a first layer of a first filtration material formed to have a cylindrical shape and only a second layer of a second filtration material formed to have a cylindrical shape in intimate contact with the outer peripheral surface of said first filtration material;
    said first filtration material is made of glass paper and said second filtration material is made of a nonwoven fabric being any one of PET, PE, PP, rayon, cotton, and Nylon; and
    the first and the second filtration materials each have a good wetting ability and the second filtration material has a pore diameter larger that a pore diameter of the first filtration material whereby oil mist is trapped and condensed in the first material and forms drops which increase in size by movement through the second material sufficiently to avoid being carried out through of the exit hole by gas flowing through the filter;

and, so that the first filtration material can be formed to provide different thicknesses and the second filtration material can be formed to provide different thicknesses to adjust the filtration efficiency and the pressure drop.

14. A gas filter for removing oil mist from a gas comprising a cylindrical case and a filter element provided inside said cylindrical case, an inlet hole and an outlet hole being formed in said cylindrical case, the gas filter having a structure such that said filter element comprises a filtration portion formed to have a cylindrical shape;

said filter element is provided so that the inside of said cylindrical case is divided into an inner peripheral space surrounded by the inner peripheral surface of said filtration portion, and an outer peripheral space surrounded by the outer peripheral surface of said filtration portion and the inner surface of said cylindrical case;

said inlet hole is formed in said cylindrical case so as to communicate with said outer peripheral space, said outlet hole is formed in the upper portion of said cylindrical case so as to communicate with said inner peripheral space, gas introduced from said inlet hole into said outer peripheral space is caused to pass through said filtration portion, inflow into said inner peripheral space and outflow to the outside from said outlet hole, and oil mist contained in said gas is separated and removed by said filter element, wherein:

said filtration portion is composed only a second layer of a second filtration material formed to have a cylindrical shape and only a first layer of a first filtration material formed to have a cylindrical shape in intimate contact with the outer peripheral surface of said second filtration material;

said filtration portion is composed of a first filtration material formed to have a cylindrical shape and a second filtration material formed to have a cylindrical shape in intimate contact with the outer peripheral surface of said first filtration material;

said first filtration material is made of glass paper and said second filtration material is made of a nonwoven fabric being any one of PET, PE, PP, rayon, cotton, and Nylon; and the first and the second filtration materials each have a good wetting ability and the second filtration material has a pore diameter larger that a pore diameter of the first filtration material whereby oil mist is trapped and condensed in the first material and forms drops which increase in size by movement through the second material sufficiently to avoid being carried out through of the exit hole by gas flowing through the filter;

and, so that the second filtration material can be formed to provide different thicknesses and the first filtration material can be formed to provide different thicknesses to adjust the filtration efficiency and the pressure drop.

15. The gas filter of claim 1, wherein the pore diameter of the first filtration material is between 5 um and 20 um.

16. The gas filter of claim 6, wherein the pore diameter of the first filtration material is between 5 um and 20 um.

17. The gas filter of claim 13, wherein the pore diameter of the first filtration material is between 5 um and 20 um.

18. The gas filter of claim 14, wherein the pore diameter of the first filtration material is between 5 um and 20 um.

19. A gas filter for removing oil mist from a gas comprising a case with an interior and a gas inlet and a gas outlet communicating with said interior and, a filter element provided in said interior between said gas inlet and said gas outlet, said filter element comprising a filtration portion consisting only of two filtration materials being a first filtration material made of glass paper on only a gas inlet side of the filtration portion and a second filtration material made of a non-woven fabric in intimate contact with only a gas outlet side of the first filtration material, to define a flow path for gas extending from the gas inlet into the glass paper via the inlet side and out from the glass paper via the outlet side into and through the second filtration material and then to the gas outlet wherein:

the glass paper and the second filtration material each have a good wetting ability and the second filtration material has a pore diameter larger than a pore diameter of the glass paper whereby oil mist is trapped and condensed in the glass paper and forms drops which increase in size by movement through the second filtration material sufficiently to avoid being carried out through of the exit hole by gas flowing through the filter.

20. The gas filter of claim 19, wherein the pore diameter of the first filtration material is between 5 um and 20 um and the pore diameter of the second filtration material is 55 um.

* * * * *